United States Patent [19]

Hanyu et al.

[11] Patent Number: 4,660,488
[45] Date of Patent: Apr. 28, 1987

[54] COMPUTER SEWING MACHINE

[75] Inventors: Susumu Hanyu; Kenji Kato, both of Hachioji, Japan

[73] Assignee: Janome Sewing Machine Industry Co., Ltd., Japan

[21] Appl. No.: 756,116

[22] Filed: Jul. 18, 1985

[30] Foreign Application Priority Data

Jul. 20, 1984 [JP] Japan ................................. 59-149396

[51] Int. Cl.⁴ .............................................. D05B 3/02
[52] U.S. Cl. .................................... 112/454; 112/456; 112/457; 112/458
[58] Field of Search ...................... 112/454, 453, 266.1, 112/121.12, 121.11, 262.1, 102, 103, 78, 456, 457, 458

[56] References Cited

U.S. PATENT DOCUMENTS

| 4,200,048 | 4/1980 | Makabe et al. | 112/454 |
| 4,325,315 | 4/1982 | Totino et al. | 112/266.1 |
| 4,389,954 | 6/1983 | Makabe et al. | 112/454 |
| 4,413,574 | 11/1983 | Hirota et al. | 112/121.12 |
| 4,416,209 | 11/1983 | Susumu | 112/266.1 |
| 4,434,729 | 3/1984 | Davidson | 112/453 |
| 4,557,207 | 12/1985 | Turner et al. | 112/454 X |

Primary Examiner—Peter Nerbun
Attorney, Agent, or Firm—William A. Drucker

[57] ABSTRACT

An electronic pattern stitch sewing machine is disclosed in which stitch control letter pattern data is stored to produce letters in a laterally or vertically readable first orientation and in which stitch coordinate mode changing data is stored to modify the letter pattern data to change the stitch coordinates of the letter patterns thereby orienting the letters in a direction perpendicular to said first orientation.

4 Claims, 4 Drawing Figures

COMPUTER SEWING MACHINE

BACKGROUND OF THE INVENTION

1. Field of the Invention:

The invention relates to a computer sewing machine and more particularly relates to a sewing machine of the type having a memory storing stitch control data for different patterns which may be selectively and sequentially read out to control stitch forming instrumentalities to thereby produce a series of patterns which may be changed from one predetermined stitching mode to another different stitching mode.

2. Description of the Prior Art:

According to the conventional computer sewing machine, the stitch patterns including picture patterns, alphabet letters, numbers and the Japanese alphabet letters (kana) are normally stitched as each oriented in the direction substantially perpendicular to the fabric feeding direction. In this case, if the alphabet letters or numbers are selectively stitched in series, these letters or patterns may be read as written in the lateral direction. However, independence upon the patterns such as the Japanese alphabet letters, it may be desired that the stitch patterns are stitched as written in the vertical direction. Actually in order to stitch the letter patterns in such a manner, the sewing machine operator is required to manipulate the fabric with respect to the needle each time one letter has been stitched without any insurance that the finished letters are arranged in alignment with each other. In this way it is almost impossible to obtain a series of letter patterns arranged in alignment.

The present invention has been provided to eliminate such a problem of the prior art. It is therefore a primary object of the invention to provide a computer sewing machine capable of automatically changing the stitch patterns from one stitching mode to another stitching mode and vice versa. It is another object of the invention to provide the computer sewing machine which may be easily operated to be set into the mode to the another mode. The other features and advantages will be apparent from the following description of the preferred embodiments in reference to the attached drawings.

DETAILED DESCRIPTION OF THE INVENTION

Figure 1:
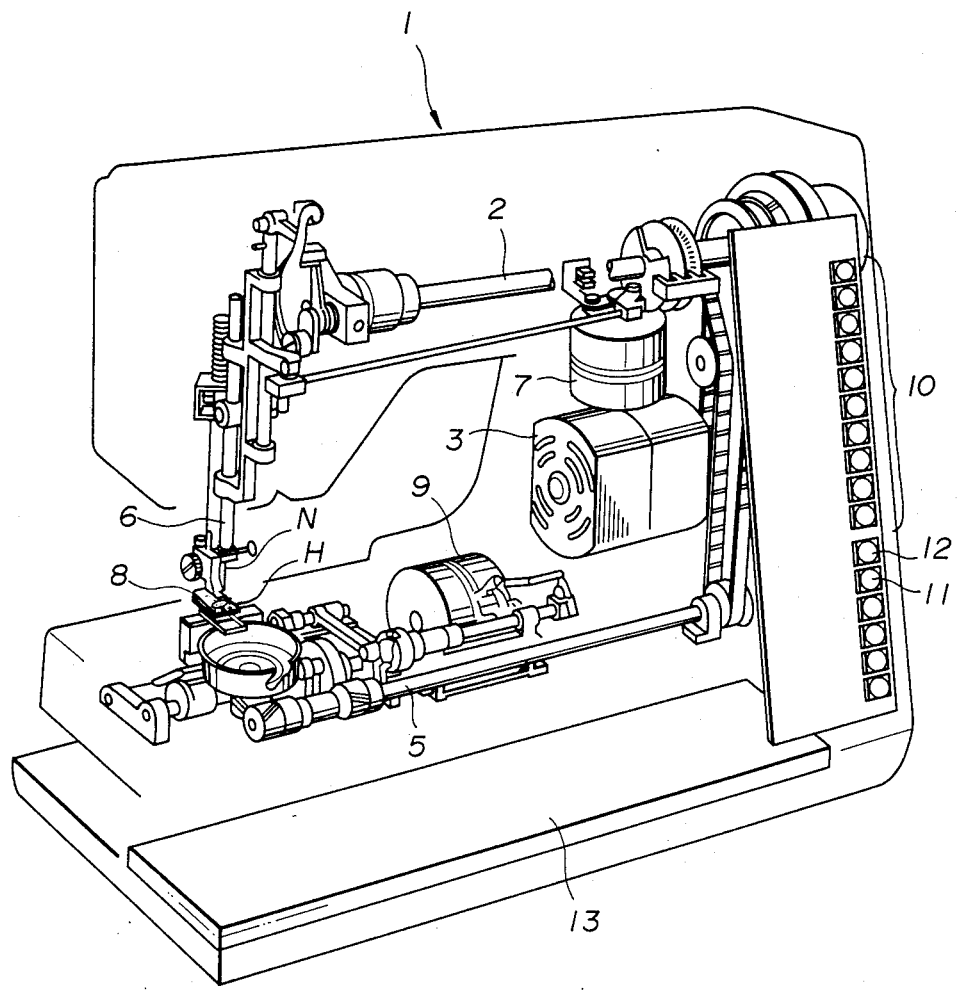
FIG. 1 is a perspective view of a sewing machine according to the invention.

In reference to FIG. 1, a sewing machine 1 has an upper drive shaft 2 which is rotated by a drive motor 3 to vertically reciprocate a needle bar 6 with a needle N attached to the lower end thereof. The rotation of the upper drive shaft 2 is transmitted to a lower shaft 5 through a transmission belt 4. Thus the lower shaft 5 is rotated to drive a loop taker and simultaneously to reciprocatingly move a feed dog 8 up and down and back and forth in a horizontal plane through intermediate actuating mechanisms provided therebetween. Thus the feed dog 8 is operated in parallelogram to feed a fabric (not shown) with respect to the needle N. The needle N is operatively connected to a stepping motor 7, which is operated to control the swinging amplitude of the needle laterally of the fabric feeding direction. The feed dog 8 is operatively connected to another stepping motor 9, which is operated to control the fabric feeding amount of the feed dog.

A group of operating keys 10, 11 and 12 are provided on a front face of the sewing machine 1. The keys 10 are pattern selecting keys which are selectively operated to read out a pattern or patterns directly or by the pattern number. The key 11 is a mode changing memory key which is operated to change a stitching mode from Mode I to Mode II as will be mentioned hereinafter, wherein the selected patterns of mode II are memorized in combination to be accordingly stitched. The key 12 is a memory key which is operated to memorize the patterns of mode (I) in combination to be accordingly stitched. The abovementioned operations are made under the control of an electronic control circuit part 13 including a microcomputer.

Figure 2:
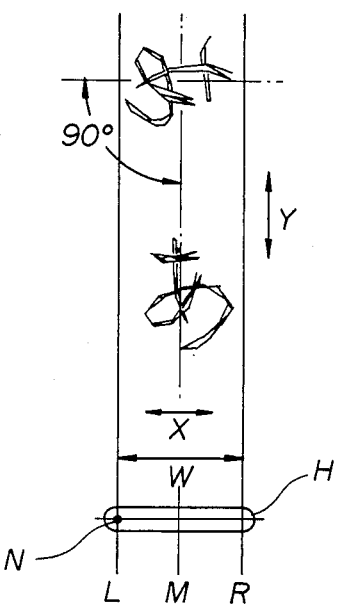
FIG. 2 is an explanatory view of letter patterns to be produced in accoreance to the invention.

In reference to FIG. 2, the needle N is swingable in the directions X in reference to one of the three basic needle positions L, M, R within a maximum range W of a laterally extended needle dropping hole H of the sewing machine, while a fabric (not shown) is transported in the directions Y by the feed dog 8. Thus a character such as a Japanese cursive syllabary " あ " (the Japanese alphabet) may be produced.

Figure 3:
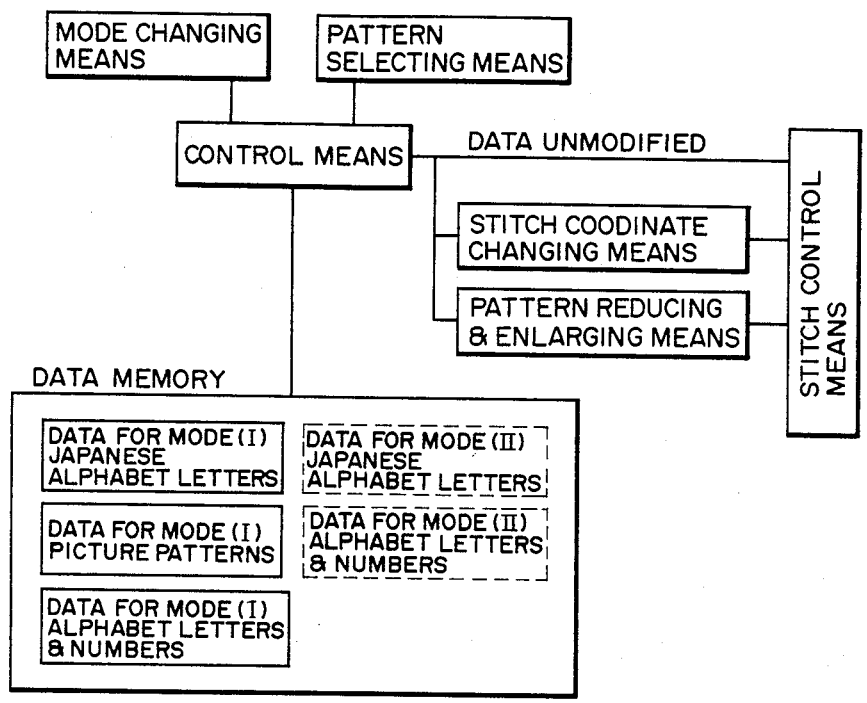
FIG. 3 is a block diagram control circuit of the invention in which a data memory may store data in two modes (I and II) or in one mode (I) only.

In reference to FIG. 3 showing a block diagram control chart, a memory stores the data for mode (I) of the Japanese alphabet letters, the data for mode (II) of the Japanese alphabet letters (kana), the data for mode (I) of picture patterns, the data for mode (I) of alphabet letters and numbers and the data for mode (II) of alphabet letters and numbers. The memory forms a block together with the control means including the electronic control circuit part 13, the mode changing means including the mode changing memory key 11 and the pattern selecting means including the pattern selecting keys 10. The data stored in the memory may be transmitted to a stitch control means directly without being subjected to a modification process.

Figure 4:
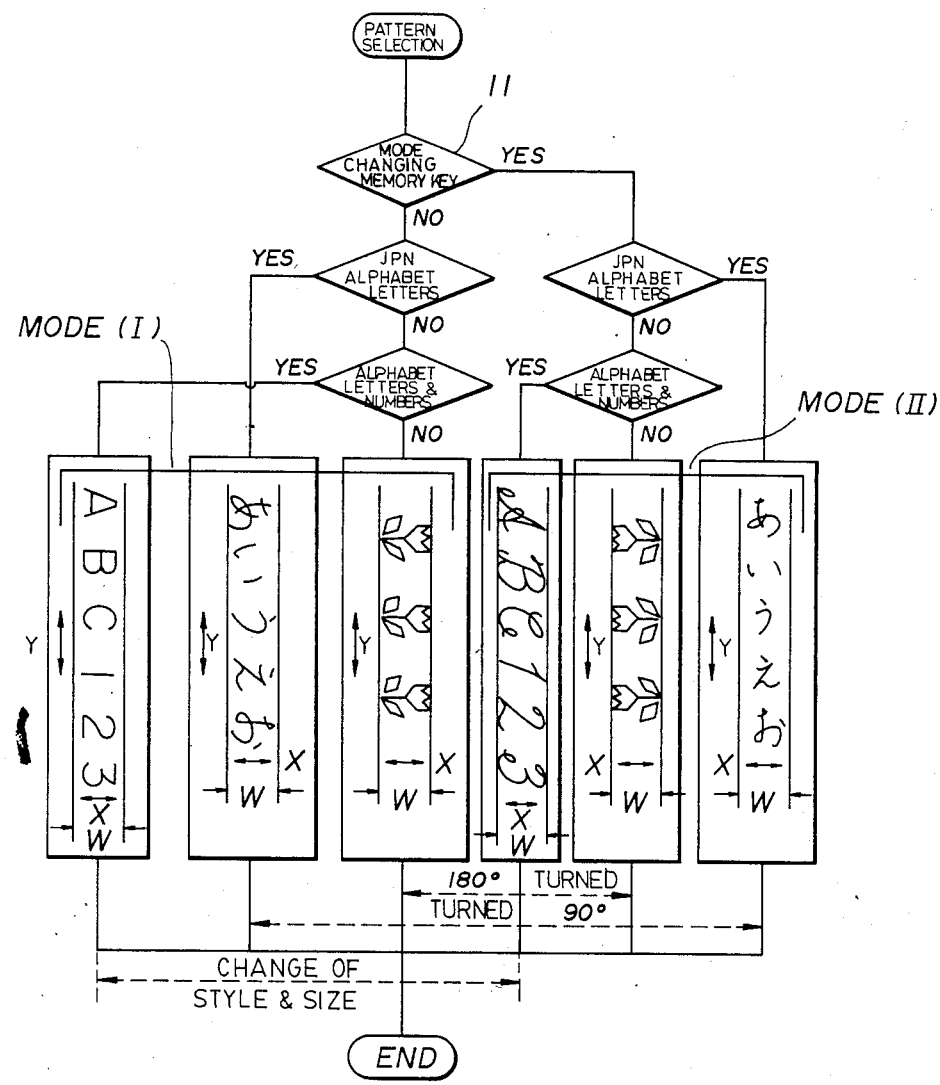
FIG. 4 is an explanatory view of stitch patterns to be changed from one stitching mode to another stitching mode.

As shown in FIG. 4, the mode (I) of the patterns selected by the selective operation of the pattern selecting keys 10 may be changed to the mode (II) by operation of the mode changing memory key 11. Precisely the block styled alphabet letters and numbers are changed into the script styled ones. The Japanese alphabet letters, which are produced in the lateral direction, are changed into a state in which these letters are produced in the vertical direction. The flower patterns are changed into a state in which these flowers are laterally inverted. In other words, the alphabet letters and numbers in mode (I) are changed in style or may be changed in size in mode (II). The Japanese alphabet letters in mode (I) are turned counterclockwise by 90° around the center axis in mode (II). The flower patterns in mode (I) are turned by 180° around the center axis in mode (II) as shown in FIGS. 2 and 4.

According to the invention, the data for mode (II) may be all eliminated from the data memory. Instead a stitch coordinate changing means and a pattern reducing & enlarging means are provided in parallel between the control means and the stitch control means. The stitch coordinate changing means may be responsive to operation of the mode changing memory key 11 to modify the data memorized in the control means to thereby change the stitch coordinates of the selected patterns, i.e. to change the patterns of mode (I) into mode (II) as shown in FIG. 4. On the other hand, the pattern reducing & enlarging means may be responsive to operation of the mode changing memory key 12 to modify the data memorized in the control means with pattern reducing or enlarging coefficients to reduce or enlarge the series of selected patterns.

What is claimed is:

1. A computer sewing machine having an upper drive shaft rotated to vertically reciprocate a needle to penetrate a fabric to be sewn and to operate a feed dog to feed said fabric with respect to said needle, stitch control means for controlling the movement of said needle laterally of said fabric feeding direction and for controlling the amount of fabric being fed and the direction thereof, said sewing machine comprising:

a memory storing stitch control data which may be selectively and sequentially read out to control said stitch control means, said stitch control data including data for the patterns of specific letters which may be oriented in a first mode to be readable in the lateral direction or in a second mode to be readable in the vertical direction, said memory storing said letter data in a condition corresponding to one of said first and second modes;

pattern selecting means including a plurality of pattern selecting keys selectively operated to normally select the patterns stored in said memory, said pattern selecting keys including the keys for selecting said patterns of specific letters;

control means responsive to the operation of said pattern selecting keys to read out the data for said selected patterns from said memory;

a function key operated to memorize in said control means the data for a plurality of patterns including the patterns of said specific letters selected in a predetermined order by operation of said pattern selecting keys;

mode changing means including a mode changing key operated to change said selected patterns of specific letters from one of said first and second modes to the other thereof; and stitch coordinate changing means storing stitch coordinate mode changing data activated to modify said pattern data for said specific letters selected in a predetermined sequence by operation of said pattern selecting keys, said mode changing data responsive to the operation of said mode changing key to modify said pattern data for said specific letters per stitch of said specific letters to change the stitch coordinates of said selected specific letters to thereby orient said letters in the other of said first and second modes.

2. The computer sewing machine as defined in claim 1 wherein said patterns of specific letters include the patterns of alphabetic letters.

3. The computer sewing machine as defined in claim 1 wherein said patterns of specific letters include the patterns of Japanese alphabetic letters.

4. The computer sewing machine as defined in claim 2 wherein said patterns of specific letters include the patterns of Japanese alphabetic letters.

* * * * *